United States Patent Office 3,333,978
Patented Aug. 1, 1967

3,333,978
WATER - DISPERSIBLE COATING COMPOSITIONS AND PHENOLIC WOOD BASES COATED THEREWITH
Charles C. Clark, Kenmore, and Arthur J. Krawczyk, Cheektowaga, N.Y., assignors to Textron Inc., a corporation of Rhode Island
No Drawing. Filed Dec. 15, 1961, Ser. No. 159,744
40 Claims. (Cl. 106—264)

This invention relates to compositions especially adapted for coating woods which are prone to stain, particularly redwood and cedar. More specifically, the coating compositions contain a drying oil component as an essential ingredient and are dispersible in aqueous media and in addition the compositions include anti-staining agents.

Redwood and cedar are well known to provide excellent lumber for building purposes since they are resistant to decay and vermin and thus are advantageous finishing materials. Often these woods are left unpainted; however, in many instances it is desirable to coat the woods to change their color or to provide further protection against the elements. When covering these woods with oil-base paints no unique problem arises; however, when employing a water-base coating composition the woods are prone to stain causing an unsightly surface finish which also exhibits great reluctance to dry. These stains are very difficult or even impossible to cover by a paint topcoat.

The staining of redwood and cedar is caused by the occurrence in these woods of a variety of water-soluble materials which in general can be classed as phenols. Redwood contains polyphenolic ingredients including tannins as water-soluble coloring matter and other water-soluble components of the wood include cyclitols, polysaccharides and simple sugars. Various alcohol-soluble components such as polytannins, phlobaphenes and other coloring matter may also lead to staining problems. Cedar contains water-soluble materials which are polyphenols such as derivatives of polycatechol and thujaplicines and these materials can give surface stains. It should be noted that the staining phenomenon may occur only on certain pieces of lumber or even a part of a given piece of lumber and in any case the staining is often in the form of streaks or striations on the wood. The occurrence of staining is influenced by factors such as the part of the tree from which the lumber is derived as the staining components tend to concentrate in certain portions of the tree. Staining is also affected by the treatments, either natural or man-induced, to which the lumber has been subjected, since these factors may give rise to extraction, dissipation or modification of the staining components of the wood. In any event, the user of the lumber is faced with the possibility and even the probability that some portions of the finish will stain and thus his coating composition must be adapted to overcome this problem.

The advantages of using water-based paints are well known and include factors such as low odor, non-flammability, low toxicity and water clean-up of brush and tools used in painting. It has also been appreciated that many present water-based paints which do not contain drying oil components exhibit undesirable properties especially when used as exterior coatings where they are subjected to the action of water, strong ultraviolet light and other deteriorating factors. Thus to provide paints having the desired characteristics, the art has endeavored to supply vehicles which have the desirable properties of both oil-and water-soluble paints. These products contain a substantial amount of the drying oil component and generally are dispersible in water.

There have been efforts to market drying oil-containing vehicles which can be emulsified in water only through the use of an extraneous emulsifying agent, that is an ingredient which is not chemically reacted with the drying oil but which exhibits emulsifying properties to provide a dispersion of the oily vehicle in water. By and large, these water emulsions have not met with significant commercial success due to their disadvantageous properties. For instance, the emulsions often exhibit poor stability and inadequate film-forming characteristics. The emulsions are difficult to pigment and are sensitive to zinc oxide which should be added as a fungicidal and mildewcidal agent. The emulsions usually have a low paint solids content for a given viscosity and if sufficient solids are included to provide good hiding power then the emulsion is too thick for good coverage and ease of application. Moreover, the emulsion coatings have exhibited poor ability to wet, penetrate and adhere to substrates such as chalky surfaces of weathered, previously painted woods.

All of these difficulties have led to the development of liquid paint vehicles which contain a drying oil component as an essential ingredient and yet avoid the shortcomings of the drying oil emulsion paints by having the property of being self-dispersible in water. Such compositions are the principal subject of the present invention, although out anti-staining agents can be employed in drying oil emulsions.

Even though these water-dispersible drying oil vehicles can be formulated to provide paints, their direct application on bare redwood and cedar as aqueous dispersions still leads to surface staining as well as poor drying. In the present invention we overcome these problems by providing in the coating compositions at least two separate types of additive materials, one being water-soluble and another being drying oil-soluble. The compositions, although especially adapted for coating woods containing phenols can also be used to coat other surfaces including woods such as pine.

The relatively water-soluble anti-staining agents of this invention are heavy metals salts. The salt or anionic portion of the additive can be organic or inorganic and the metal salt is soluble in water at least to the extent of about 1 weight percent at ambient temperature, e.g., 70° F. The heavy metal of these salts has an atomic number from about 25 to 60, preferably the metal has an atomic number from about 27 to 30. Such salts have been used as catalysts in the liquid phase, air oxidation of organic compounds, for instance when converting alkyl aromatics to aromatic carboxylic acids. The anion part of the salt is usually selected to give the desired water-solubility and may be derived from an inorganic or strong mineral acid or an organic carboxylic acid which may, if desired, be further substituted with non-interfering constituents. The lower fatty or alkanoic acids, preferably of 2 to 4 carbon atoms are exemplary and the metal acetates are especially preferred. The metal salts are generally insoluble to any appreciable extent in drying oils. When the coating composition is to be white the essentially colorless or white salts are advantageously employed.

The heavy metal salt can be added to the drying oil vehicle itself, especially if the vehicle contains at least enough water to dissolve or solubilize the salt, or to a dispersion of the vehicle in large quantities of water up to the amount present in the vehicle when diluted to application viscosity. The salt may also be made as a concentrate in water and then the concentrate combined with either the drying oil component, the remaining water or their mixture. In any event, the additive is used in a minor amount sufficient to give the coating composition anti-staining properties. Generally, the heavy metal salt is at least about 1 weight percent of the drying oil vehicle and usually the amount will not be greater than about 20% since larger amounts seem uneconomic at this time. Preferably, the amount of this anti-staining agent employed is about 2 to 12% of the vehicle.

Although the water-soluble heavy metal salts by themselves afford improvement in terms of anti-staining characteristics, it is most desirable to include in our compositions a drying oil soluble, relatively water-insoluble heavy metal carboxylic acid salt or soap. The salts are usually aliphatic including cycloaliphatic. In this ingredient the heavy metal has an atomic number of about 20 to 82 and often the vehicle will include one or more of the manganese, lead or cobalt soaps. The organic carboxylic acid radical usually has about 5 to 40 carbon atoms and can be, for instance, the higher fatty acids of say 12 to 24 carbon atoms or a cyclo aliphatic carboxylic acid of even less number of carbon atoms. The acid radical can be substituted or unsubstituted, straight or branched chain and is generally unsaturated especially if not cycloaliphatic. Suitable acid salts include the oleates, naphthenates, linoleates, salts of polymerized acids such as ricinoleic acid dimer, etc. Preferred acids contain one carboxyl group. The oil-soluble heavy metal soaps are generally known as paint driers and will be used in minor amounts sufficient to give a substantial anti-staining and drying effect, for instance about 0.5 to 15 weight percent, preferably 2 to 8% based on the drying oil vehicle.

We have also found it advantageous to include in our composition a small amount of a water-soluble lower monocarboxylic alkanoic or fatty acid of, for instance, 1 to 4 or more carbon atoms, especially acetic acid. The acids can be substituted, if desired, with non-deleterious substituents as in the case of chloroacetic acid. Also we can employ inorganic or mineral acids such as hydrochloric and sulfuric acid rather than the lower fatty acids. The mineral acids usually have dissociation constants in water of at least about $10^{-2}$ for the first hydrogen. A minor amount of acid is used sufficient to improve the anti-staining characteristics of the composition and in general amounts as set forth above for the water-soluble heavy metal salts can be employed. The acids are water-soluble to at least this extent and they can be added to the vehicle in the manner of incorporating the water-soluble heavy metal salt.

There are a number of drying oil-based, water dispersible paint vehicles in which the anti-staining agents are effective. The vehicle in general contains a substantial amount of a drying oil component, usually at least about 50 weight percent, and preferably at least about 70% and up to about 90% of the vehicle. With non-water-self-dispersible vehicles the drying oil component may be up to 100% of the vehicle. A drying oil ester can be employed in unmodified state but most often is modified with a polyfunctional material such as a polycarboxylic acid, polyolefin and/or a polyhydric alcohol. The modifying constituents may be up to about 75% of the drying oil component. Preferably this amount is up to about 30% and often about 10 to 30%. The drying oil ester can be the essential balance. In a number of the water self-dispersible vehicles the drying oil component is reacted with an aliphatic polyether, including alkoxy polyethers, preferably a polyoxyethylene ether. These polyethers may be about 10 to 50% of the vehicle, advantageously about 10 to 30%. The polyethers are usually of about 200 to 6000 molecular weight and the repeating alkoxylene radical is of 2 to 3 carbon atoms. In the case of non-water-self-dispersible vehicles, the extraneous emulsifying agent can be a polyether, including polyethers per se or polyethers modified or reacted to have ester, alkoxy or other groups as well as the polyether configuration. The repeating polyether group will often have 2 to 3 carbon atoms. The polyether agent may of course be used in combination with other emulsifying agents.

A particularly suitable water self-dispersible vehicle is described in U.S. patent application Ser. No. 81,694, filed Jan. 10, 1961, in the names of H. M. Schroeder and J. A. Pawlak, and now U.S. Patent No. 3,100,157, hereby incorporated by reference. The products of that application are long oil compositions which provide paints that are air-driable to hard films exhibiting good resistance to water, ultraviolet light and other film degrading factors. Such paints also have the desired advantage of water-soluble paints enumerated before. The paints are readily pigmented and are stable to zinc oxide. The formulations are also characterized by a high percentage of total solids thus providing good coverage, hiding power and durability, and the products adhere firmly to chalky surfaces. Paints based on the long oil vehicle of the cited application are especially characterized by a high solids content at application viscosity affording good film thickness leading to a better overall paint job.

The water self-dispersible paint vehicle of application Ser. No. 81,694 is made through reaction of a long oil drying oil component and a polyoxyethylene polyol of 3 to 6 hydroxyl groups. The drying oil component contains at least about 80, preferably at least about 85 or even upwards of about 90, weight percent of a drying or unsaturated fatty acid in esterified form. The presence of at least about 80% of the ester provides a vehicle of excellent characteristics for use on exterior surfaces and insures maximum compatibility with zinc oxide. Thus the drying oil ester may be used as such or it may be reacted with up to about 10 or even up to about 15 or 20 weight percent of a modifying constituent prior to making the water-dispersible vehicle of this invention through reaction with the polyoxyethylene polyol. These percentages are based on the mixture of drying oil and modifying constituents. The modifying material contains a polyfunctional group or configuration, that is it can combine, e.g. through olefin-bond polymerization or condensation, with two or more molecules of the drying oil ester or a modifying constituent.

The drying oil component and polyoxyethylene polyol are generally condensed in a proportion of about 75 to 90 weight percent of drying oil component to about 10 to 25 weight percent of the polyoxyethylene polyol based on their mixture. Preferably, the polyoxyethylene polyol reactant is about 12 to 20 weight percent based on its mixture with the drying oil component. The amount of polyoxyethylene polyol to be employed may vary with the nature of the desired product; in general, higher quantities of the polyether will impart more hydrophilic character and consequent water solubility. The precise choice of quantity of polyether employed may however vary with the characteristics of the oil or modified oil employed, such as viscosity. The choice will also vary with the desired solution viscosity as well as the drying time and other characteristics of the product.

Useful polyoxyethylene polyols have the formula $$R[-O(C_2H_4O)_nH]_m$$

where R is an $m$-valent aliphatic hydrocarbon radical of 3 to 6 carbon atoms derived from a polyhydric alcohol of 3 to 6 hydroxyl groups, $n$ is an average of 4 to 12 and $m$ is 3 to 6. These materials generally have an average molecular weight of about 500 to 2000 and advantageously the molecular weight is in the range of about 600 to 1200. The preferred polyols have 3 to 4 hydroxyl groups especially 3 such as in the case of the polyoxyethylene glycerols which are liquid, water-soluble materials that are easy to handle and give reaction products affording quick drying films. Suitable polyoxyether polyols include among others the polyoxyethylene derivatives of glycerol, trimethylol propane, hexanetriols, pentaerythritol, sorbitol, etc. It will be understood that blends of higher and lower molecular weight polyoxyether polyols to yield mixtures within the approximate foregoing molecular weight ranges are also contemplated.

Although the vehicle is dispersible in water, in some instances it may be preferred to include a coupling solvent in the composition in order to increase the solution range of the reaction product in water, for instance it is most advantageous to obtain a solution in water at a dilution which gives a composition having a viscosity in the approximate 1 to 3 poise range desired for surface application. Thus after the reaction product is formed it can be mixed with up to about 30 weight percent of the coupling agent, for instance about 5 or 10 to 25 weight percent, preferably about 15 to 20 weight percent, of an oil and water-soluble coupling agent. The agents are often oxygenated organic compounds such as ethers, alcohols, or esters. Preferred coupling agents are ethylene glycol ethers having the formula $$RO(CH_2CH_2O)_xR_1$$

wherein R is a monovalent hydrocarbon radical having up to about 8 carbon atoms, preferably not more than about 5 carbon atoms, $x$ is 1 to 2 and $R_1$ is hydrogen or $$-\overset{O}{\underset{\|}{C}}-CH_3$$

Advantageously, R is a lower alkyl radical having, for instance, 1 to 4 or more carbon atoms. Included within the oil and water-soluble coupling agents are ethylene chlorohydrin, butanol, ethylene glycol monobutyl ether, ethylene glycol monoethyl ether, ethylene glycol monomethyl ether, ethylene glycol monophenyl ether, ethylene glycol monoisoamyl ether, methyl butynol (2-methyl-3-butyn-2-ol), the acetates of these ethers and the corresponding diethylene glycol ethers and acetates, etc. In addition to the preferred coupling agents noted above, coupling agents giving vehicles, intermediate between a typical white milky emulsion and a translucent colloid, in a viscosity range at 40 NV of 0.5 to 3.5 poises, and which are stable include 15 and 25% diacetone alcohol, 15 and 25% dimethyl formamide, 15 and 25% dimethyl acetamide, 15 and 25% acetonitrile, 15 and 25% tetrahydrofuran and 15 and 25% Shell's Pent-oxol (4-methoxy-4-methyl-2-pentanol). Generally, the coupling agents boil in the range of about 100 to 200° C. This constituent, as is the case with the others described, usually does not contain additional substituent groups although such may be present if the over-all effect desired is not materially reduced.

In preparing these water-dispersible vehicles the drying oil component and polyoxyethylene polyol can be reacted at an elevated temperature, for instance of about 150 to 250° C. in the presence or absence of a catalyst. The reaction time is that which gives a liquid, water self-dispersible product and preferably it is most advantageous to stop the reaction when the heating of selected samples shows that the viscosity of the product in water approximates a minimum. The reaction product usually has a viscosity of up to about 100 poises or somewhat greater; often the viscosity does not exceed about 40 poises and most advantageously is less than about 10 poises, for instance about 5 to 10 poises. Usually the reaction time is about 1 to 12 or more hours; however, we prefer times of about 2 to 6 hours.

The long oil drying oil component of the water-dispersible liquid reaction product of application Ser. No. 81,694 is an unsaturated aliphatic monocarboxylic acid ester, e.g. glyceride, whether natural or synthetic. The drying oil ester is of a fatty or alkenyl carboxylic acid having about 14 to 20, preferably about 18, carbon atoms, and 1 to 3 or more, usually at least 2, unsaturated carbon-to-carbon or olefinic bonds. The alcohol portion of the ester is of an alkane polyhydric alcohol of 3 to 6 hydroxyl groups and 3 to 6 carbon atoms. The preferred alkanol source of the ester radical is glycerol which affords glycerides such as those occurring in nature. The drying oil component initially can be in acid form and be subsequently reacted with the polyhydric alcohol to form the ester. Alternatively, the acid can be reacted with the polyhdric alcohol at the same time the drying oil component is being modified, for instance with a polyhydric alcohol and with or without another modifying constituent such as a polycarboxylic acid. In any event the drying oil component is essentially in the ester form when reacted with the polyoxyethylene polyol. Heat bodied or polymerized forms of the drying oil acids and esters are also useful. Thus the drying oil component may be the drying oil ester as such or the carboxylic acid or ester can be modified through pre-reaction with up to about 20 weight percent, preferably about 5 to 15 weight percent, of one or more polyfunctional compounds such as polyolefins, polycarboxylic acids and polyhydric alcohols. These acids and alcohols can also have olefinic unsaturation. The modification preferably involves a polyolefin or both a dicarboxylic acid and polyhydric alcohol. For instance, the modifying polycarboxylic acid and polyhydric alcohol will usually be employed in approximately esterification stoichiometric proportions although either may be in excess. We prefer an excess of alcohol. Generally about 25 to 75 weight percent of each of the polycarboxylic acid and polyhydric alcohol based on their mixture is used in modifying the drying oil ester with such materials. The various drying oil components can be further substituted with non-interfering substituents although they are most often employed in unsubstituted form. Regardless of its constituency the drying oil component, whether an ester itself or a modified ester, is essentially liquid at ambient temperatures and in general has a viscosity in the ranges set forth above with respect to the polyoxyethylene polyol reaction product.

The drying, including semi-drying, oils which can be used in the preparation of the water-dispersible vehicles include the synthetic polyhydric alcohol esters of non-conjugated and conjugated unsaturated fatty acids as well as non-conjugated and conjugated natural drying oils of animal and vegetable origin, all having an iodine value not less than about 110. For example, soybean oil, linseed oil, safflower oil, tung oil, perilla oil, China-wood oil, oiticica oil, walnut oil, poppyseed oil, etc., are among the natural drying and semi-drying oils which may be used while the unsaturated acids include oleic, ricinoleic, linoleic, linolenic, etc. Where tung oil or other natural conjugated oils are employed, it is preferred to first heat the oils to an elevated temperature of 280° C. or thereabouts to "gas-proof" or enable them to form non-wrinkling films, just as would be the case in their use in conventional organic solvent system paints or varnishes. Thus, the conjugated oils may be considered a special case of the modified oils which are operable. Similarly, glycerol and other higher polyhydric alcohol esters of the mixed fatty acids which characterize the natural drying and semi-drying oils may be employed. Included would also be the polyhydric alcohol esters of tall oil and of tall oil fatty acids.

When modifying drying oils are used, the pre-reaction of the drying oil acid or ester component can be with a polycarboxylic acid, polyhydric alcohol or their mixture. These materials encompass aliphatic, including cycloaliphatic, and aromatic dicarboxylic acids of, for instance, 2 to 12, preferably 4 to 8, carbon atoms. Representative acids are: the alpha, beta ethylenically unsaturated polycarboxylic acids, maleic, fumaric, aconitic, etc.; the saturated aliphatic polycarboxylic acids, succinic, glutaric, sebacic, azelaic, tartaric, etc.; and the aromatic polycarboxylic acids such as the phthalic acids. Also the acid anhydrides, esters, partial esters and other forms can be employed.

The polyhydric alcohols employed in the modified drying oils are aliphatic, including cycloaliphatic, in character, and are the same as those forming the ester portion of the drying oil component. The materials are alkane polyhydric alcohols generally of 3 to 6 carbon atoms and containing 3 to 6 hydroxyl groups to a molecule. Among the useful polyhydric alcohols are glycerol, mannitol, sorbitol, pentaerythritol, trimethylol propane, trimethylol ethane, 1,3,6-hexanetriol, etc. and these can be mixed with other materials, for instance ethylene glycol, diethylene glycol, dipentaerythritol, etc.

The drying oil component may be modified through reaction with a polyolefinic or even a mono-olefinic material. The olefins can be aliphatic, including cycloaliphatic, that is alkenyl, hydrocarbons. The olefins can also be substituted as with an aromatic, e.g. phenyl, radical. Usually the olefinic material has about 4 to 10 carbon atoms, and among the useful material are cyclopentadiene, cyclohexadiene, 1,4-butadiene, isoprene, styrene, vinyl toluene, etc.; however, polymers of these olefins containing 2 to 10 units of monomer may also be employed.

Although we strongly prefer the maleic acid (including anhydride)-pentaerythritol modified oils, another class which may be employed is defined as the long oil modified phthalic anhydride, or isophthalic acid modified oils in which the oil content is about 80% or greater, and which oils are capable of being made at 100% non-volatile at viscosities of not significantly greater than about 100 poises. Specifically, such modified long oils can be made as liquid materials without the use of naphtha or other petroleum or organic solvents. This fact is of great consequence in obtaining the unique liquid products which are capable of thinning with water to obtain dispersions and solutions having very useful properties as paint vehicles and for other purposes.

The long drying oil component can be modified by the described or other constituents under the usual conditions, e.g. temperatures of about 200 to 300° C. and pressures at or above atmospheric. Generally the reaction is continued to insure a liquid product, for instance, prolonged heating may cause undesirable gelation, and most often the acid number of the liquid product is below about 20.

Although the drying oil component-polyoxyethylene polyol liquid condensate can be dispersed in organic vehicles such as the usual paint thinners, the reaction product is water-dispersible and can be used most advantageously in aqueous based coating compositions containing other ingredients if desired such as solid pigments, fungicides, mildewcides, etc., which can be added to the reaction product, for instance in amounts up to about 100 weight percent, most often greater than about 10 weight percent based on the reaction product. The aqueous based coating composition can have varying amounts of water with the amount usually being decided by the coating applicator according to the characteristics desired in the composition both during application and after drying. In many instances, the water will be sufficient to give a product of about 1 to 3 poises viscosity for application to surfaces. The coating composition can also contain solid pigments and other ingredients. The various agents such as the pigment and fungicide are preferably added to the drying oil component-polyoxyethylene polyol reaction product prior to dilution for application as a coating.

Other water self-dispersible, drying oil-based vehicles are described in U.S. patent applications Ser. No. 81,700, filed Jan. 10, 1961, to Schroeder and Pawlak, now U.S. Patent No. 3,297,605 and Serial No. 130,542, filed Aug. 10, 1961, to Schroeder and Walker, these applications and the present case all having a common assignee, both of which are hereby incorporated by reference. In the first of these applications the water-dispersible vehicle is a condensate of about 75 to 90% of the drying oil ester of application Ser. No. 81,694 and about 10 to 25% of a polyethylene glycol having a molecular weight of about 400 to 2000. The final product of application Ser. No. 81,700 exhibits in general the viscosity characteristics of the vehicle of application Ser. No. 81,694 and can be prepared from the same long oil drying oil ester, modified or unmodified, and under the same conditions of reaction as set forth in the latter application. Again, the products of Ser. No. 81,700 although self-dispersible in water can be employed with a coupling agent as disclosed with respect to the vehicle of application Ser. No. 81,694. In the best products of the types shown in application Ser. Nos. 81,694 and 81,700 the polyether is generally combined with the drying oil ester, modified or unmodified in the essential absence of other unreacted drying oil modifying agents.

In application Ser. No. 130,542 the liquid, water self-dispersible vehicle is a condensate of about 70 to 90% of the drying oil ester as set forth in the other cited applications and containing at least about 25% of a drying or unsaturated fatty acid ester, preferably at least about 80% of the ester to give a long oil product, and about 10 to 30% of a polyoxyalkylene glycol of the formula $RO[(CH_2)_xO]_yH$, wherein $x$ is 2 to 3, $y$ is an integer giving a molecular weight of about 200 to 2500 and R is an alkyl radical of up to about 20 carbon atoms, preferably up to about 4 carbon atoms. In general, these products are made under the conditions and have the viscosity characteristics as set forth in the other cited applications. The alkoxy polyether can be reacted with the drying oil component while the latter is being esterified or modified, but preferably the polyether is reacted subsequent to these operations and in the essential absence of other drying oil esterifying or modifying agents. Especially suitable polyethers are the methoxy polyethylene glycols. Again, a coupling agent can be used with the products of application Ser. No. 130,542; however, their presence is less significant due to the use of the alkyl terminated polyethylene glycol.

Other water dispersible drying oil vehicles have been disclosed in the art, for instance see Arndt Patent 2,634,245 and Armitage and Trace Patent 3,001,961, hereby incorporated by reference. The products of these patents are characterized as drying oil-modified alkyd resins. For instance, Arndt reacts 70 to 90% by weight of an oil-modified alkyd resin, 30 to 60% drying oil, with 10 to 30% by weight of polyethylene glycol, whereas Armitage and Trace disclose a so-called built-in polyoxyethylene-modified product where polyoxyethylene glycol is present in the reaction mixture including the drying oil and alkyd resin components during oil modification. The amount of polyethylene glycol is 10 to 20% whereas the resin oil length may range from 35 to 80%. Polyethylene glycols of about 1000 to 6000 are preferred by Armitage and Trace, whereas Arndt mentions polyethylene glycols of above 300 to 2000 molecular weight. The vehicles of both of these patents suffer serious shortcomings as set forth in the above-cited applications, including for instance the difficulty of getting a product of good stability and film-forming characteristics, poor application to surfaces, etc. Thus these vehicles are representative of the type which can be employed in the present invention but with considerable overall disadvantage. The same is true for the non-water-self-dispersible vehicles which require the use of an extraneous emulsifying agent to obtain dispersion in water whether or not the drying oil component is reacted with a polyether. If desired, of course, one may use an extraneous emulsifying agent even in the case of a water-self-dispersible vehicle. The drying oil components previously described are the essential ingredients of the vehicles which are water-dispersible only through use of an extraneous emulsifying agent.

The following examples will serve to illustrate the present invention and are not to be considered limiting.

EXAMPLE I

A water self-dispersible paint vehicle is prepared by alcoholizing an alkali refined linseed oil with 3.9% pentaerythritol by weight for 1 to 2 hours at about 250° C. and subsequent reaction at about 250° C. with 4.9% maleic anhydride in the presence of a PbO catalyst to yield a maleic-modified oil having a viscosity of 7 poises.

331 parts of this modified oil, 69 parts of polyoxyethylene glycerol 1000 (molecular weight, 1000; hydroxyl value, 170 and freezing point −5° C.) and 0.1 part of PbO are heated together for 4 hours at 205° C.; the resinous product has a viscosity of 8 poises and a Gardner color of 8.

This vehicle is reduced to 85% non-volatile (NV) by the addition of 15% ethylene glycol monobutyl ether and employed in preparing a primer paint of the following composition:

*Primer 475-20-1*

| Component: | Parts by weight |
|---|---|
| Water-dispersible vehicle | 355 |
| Lead naphthenate (24%) | 8 |
| Manganese naphthenate (6%) | 1.25 |
| Cobalt naphthenate (6%) | 2.7 |
| Lecithin | 7.5 |
| Magnesium silicate | 300 |
| Lead silicate | 425 |
| Rutile | 150 |
| Water | 375 |

The viscosity of this formulation was 85 Krebs units.

Various anti-staining agents listed in Table I below were added in admixture with a small amount of the total water (e.g. about 5%), to the above paint formula. The resulting paints were coated on bare redwood and cedar panels and the films allowed to dry at room temperature. In some of the examples, acetic acid was added in the form of glacial acetic acid and also served as an anti-staining agent. In all cases, staining of the surface coating was inhibited due to the presence of the anti-staining agents and in general the improved composition exhibited significantly reduced drying time. The paint compositions were not significantly affected by the addition of anti-staining agents, with respect to viscosity, flexibility, increase in drying time, skinning and settling when stored in plastic-lined cans. The performance of the compositions was noted according to the ratings excellent, good, fair and poor, which indicate, respectively, no stain, slight staining tendency, moderate staining tendency and definite and extensive stain.

TABLE I

| Test No. | Anti-staining agent [1] | Condition of coating with respect to staining | |
|---|---|---|---|
| | | Redwood | Cedar |
| 1 | 0% control | Poor | |
| 2 | 1% cobalt acetate | Fair | |
| 3 | 1% cobalt acetate, 1% acetic acid | Good | |
| 4 | 1% cobalt acetate, 1% sulfuric acid (93%) | Fair | |
| 5 | 1% ceric sulfate, 1% acetic acid | Good | |
| 6 | 1% manganese acetate, 1% acetic acid | Fair | |
| 7 | 1% cupric acetate, 1% acetic acid | Good | |
| 8 | 1% ferric chloride· 6H₂O | do | |
| 9 | 1% cupric acetate, 1% butyric acid | do | Good. |
| 10 | 0.5% cobalt acetate, 0.5% butyric acid | Poor | Excellent. |
| 11 | 1% cobalt acetate, 1% propionic acid | Good | Do. |

[1] Percent based on whole paint in this and other tables.

With some agents the amount needed to avoid staining may vary. Also, as the problem of staining may be very severe with woods from certain parts of the tree, you cannot always avoid staining even when using the anti-staining agents. It is preferred to have compositions of an acid pH, for instance in Tests 3 and 4 the pH was 5.9.

A white exterior house paint containing zinc oxide, titanium dioxide and magnesium silicate and 1% of barium acetate or 1% cadmium acetate or 1% acetic acid and 1% cobalt acetate resulted in good coatings on redwood with respect to anti-staining.

When Tests 2 and 3 of Table I are repeated in the primer without the naphthenate driers, the results with respect to anti-staining on redwood were poor and fair, respectively.

EXAMPLE II

A modified oil is prepared by reacting linseed oil at 250° C. for 1-2 hours with 3.9% pentaerythritol and subsequently at 250° C. with 4.9% maleic anhydride to yield a product having a viscosity of 7 poises. 1655 g. of the modified oil is reacted for 2 hours at 220° C. with 345 grams of PEG 600 in the presence of 1.0 g. of PbO. The cooled reaction product is water-self-dispersible and is reduced with 25% ethylene glycol monobutyl ether yielding a clear vehicle of 0.9 poises viscosity.

Our anti-staining agents are added to a primer composed as follows.

| Component: | Parts by weight |
|---|---|
| Water-dispersible vehicle of Example II | 320 |
| Water | 204 |
| Mineral spirits | 203 |
| Rutile titanium dioxide | 150 |
| Basic silicate white lead | 250 |
| Magnesium silicate | 350 |
| Aluminum stearate | 2 |
| Lead naphthenate (24%) | 7.5 |
| Manganese naphthenate (6%) | 2 |

The results as to staining are shown in Table II with respect to coating bare redwood and cedar.

TABLE II

| Test No. | Anti-staining additive | Condition of coating with respect to staining | |
|---|---|---|---|
| | | Redwood | Cedar |
| 1 | 0% control | Poor | Poor. |
| 2 | 1% cobalt acetate | | Good. |
| 3 | 0.5% cobalt acetate | | Fair. |
| 4 | 0.5% cobalt acetate, 0.5% acetic acid | | Good. |
| 5 | 1% cobalt acetate, 1% acetic acid | Good | Do. |
| 6 | 1% cupric acetate, 1% acetic acid | do | Do. |

EXAMPLE III

A water self-dispersible paint vehicle is prepared by reacting 2425 g. of a linseed oil modified as in Example II, with 503 g. of polyethylene glycol 1000 at 200° C. for four hours and in the presence of 2 g. of PbO.

Our anti-staining agents are added to the primer of Example II, but substituting the paint vehicle of this Example for that of Example II. The results as a sustaining are shown in Table III with respect to coating bare redwood and cedar.

TABLE III

| Test No. | Anti-staining additive | Condition of coating with respect to staining | |
|---|---|---|---|
| | | Redwood | Cedar |
| 1 | 0% control | Poor | Poor, Fair. |
| 2 | 1% cobalt acetate | Good | |
| 3 | 0.5% cobalt acetate, 0.5% acetic acid | do | |
| 4 | 1% cobalt acetate, 1% acetic acid | do | Good. |
| 5 | 1% cupric acetate | do | Do. |
| 6 | 1% cupric acetate, 1% acetic acid | do | Do. |

EXAMPLE IV

A water self-dispersible paint vehicle is prepared by modifying an alkali refined linseed oil by alcoholysis at 250° C. with 3.9% pentaerythritol and subsequent reaction at 250° C. with 4.9% maleic anhydride to give a modified linseed oil having a viscosity of 7 stokes. 1,186 parts of this oil 213 parts of methoxy polyethylene glycol 350 (molecular weight 350, freezing point −5° C.) and 0.3 g. of PbO were heated together for 2 hours at 220° C. The clear resultant product has a viscosity of 3.5 stokes, an acid value of 6.7, Gardner color of 6.5 and Sp. Gr. of 0.9858 (15.5/15.5° C.).

Our anti-staining agents are added to the primer of Example II but substituting the paint vehicle of this Example for that of Example II. The results as to sustaining are shown in Table IV with respect to coating bare redwood and cedar.

TABLE IV

| Test No. | Anti-staining additive | Condition of coating with respect to staining | |
|---|---|---|---|
| | | Redwood | Cedar |
| 1 | 0% control | Poor, slight | Poor. |
| 2 | 1% cobalt acetate | Good | Good. |
| 3 | 1% cobalt acetate, 1% acetic acid | ___do___ | Do. |
| 4 | 1% cupric acetate | ___do___ | Do. |
| 5 | 1% cupric acetate, 1% acetic acid | Excellent | Do. |

EXAMPLE V

An emulsion paint is prepared by first premixing a grinding vehicle and pigment to obtain a smooth paste by grinding in a mill. The pigment contains 250 grams of rutile titanium dioxide and 184 grams of talc. The grinding vehicle consists of 100 grams of hydroxyethyl cellulose (2.5% water solution), 140 grams of water, 6 grams of sodium alkyl aryl sulfonate (Daxad 30), and 2 grams of polyethylene glycol P–1050. A drier mixture is made by mechanically agitating for 15 minutes, 7 grams of 25% solution of Pluronic L–64 (non-ionic surface active agent from ethylene oxide and propylene glycol) in water, 2 grams of 6% cobalt naphthenate and 5 grams of 24% lead naphthenate.

495 grams of an alkyd resin (60 parts soybean oil, 12.8 parts glycerol and 34.7 parts isophthalic acid) dispersed in 330 grams of water are mixed with the drier mixture and pigment paste. The dispersing agent for the alkyd is a reaction product of 10% isophthalic acid and 90% polyethylene glycol 1450. The emulsion of alkyd resin in water possesses a viscosity of 0.6 poises, a NV content of 59% and a pH value of 3.1.

While stirring 32 grams of water, 9.2 grams of phenyl mercuric acetate, 6 grams of an acrylic emulsion copolymer and 7.2 grams of 25% $NH_4OH$ are added to the emulsion. Agitation is continued for one-half hour. The vehicle non-volatile was 39.6% while the total non-volatile was 61.6%.

The following results were obtained when this paint was tested for stain resistance on bare redwood and cedar with the anti-sustaining agents listed:

TABLE V

| Test No. | Anti-staining additive | Condition of coating with respect to staining | |
|---|---|---|---|
| | | Redwood | Cedar |
| 1 | 0% control | Poor | Poor. |
| 2 | 1% cobalt acetate | Good | Excellent. |
| 3 | 1% cobalt acetate, 1% acetic acid | Excellent | Do. |

EXAMPLE VI

A pigment dispersion for use in an outside house paint is made from 120 grams of zinc oxide, 75 grams anatase titanium dioxide, 150 grams rutile titanium dioxide, 195 grams of water, 50 grams magnesium silicate, 120 grams of hydroxyethyl cellulose (2.5% solution in $H_2O$, 10 grams of sodium polycarboxylic acid (Tamol 731), 10 grams of ethylene glycol, 15 grams acrylic emulsion copolymer (Acrysol G–110), 8 grams of aryl alkyl polyether alcohol (Triton X–100), and 3 grams of nonyl alcohol as a defoaming agent.

The vehicle used with the above pigment dispersion consists of 350 grams of an emulsion of heat bodied linseed oil of viscosity 600 poises, having an acid value of 2.9 and a Gardner color of about 5, the oil being dispersed in water by means of 15% of a reaction product of about 55% oleic acid and 45% ethylene oxide. This emulsion of bodied linseed oil when reduced with water to 60% non-volatile forms a milky thixotropic composition of about 20 to 3 poises depending on the rate of shear and possesses a pH of 4. Further ingredients used in the vehicle were 1.8 grams 6% cobalt naphthenate, 1.7 grams 6% manganese naphthenate, 7 grams 24% lead naphthenate and 7 grams of 28% ammonium hydroxide.

When the additives given in the following table were mixed into the emulsion paint described above and tested on bare redwood the following results were obtained:

TABLE VI

| Test No. | Anti-staining additive | Condition of Coating with respect to staining |
|---|---|---|
| | | Redwood |
| 1 | Control | Poor. |
| 2 | 1% cobalt acetate | Good. |

It is claimed:
1. A liquid, water-dispersible composition of matter consisting essentially of a drying oil ester of an unsaturated fatty acid of 14–20 carbon atoms and a polyhydric alkanol of 3–6 carbon atoms and having 3–6 hydroxyl groups, a drying oil-soluble heavy metal paint drier carboxylic acid salt of a heavy metal having an atomic number of 20–82 and a carboxylic acid of 5 to 40 carbon atoms and a water-soluble heavy metal salt of a heavy metal having an atomic number of 25–60 and an acid selected from the group consisting of inorganic mineral acids and fatty acids of up to 4 carbon atoms, said heavy metal salts being present in amounts sufficient to retard surface staining of phenolic-containing wood when coated by an aqueous dispersion of said composition.

2. A liquid, water self-dispersible composition of matter consisting essentially of a condensate of about 50–90% of a drying oil ester of an unsaturated fatty acid of 14–20 carbon atoms and a polyhydric alkanol of 3–6 carbon atoms and having 3–6 hydroxyl groups and about 10–50% of an alkoxy polyether of about 200–6000 molecular weight, and being of an alkoxy group of 2–3 carbon atoms, a drying oil-soluble heavy metal paint drier carboxylic acid salt of a heavy metal having an atomic number of 20–82 and a carboxylic acid of 5 to 40 carbon atoms and a water-soluble heavy metal salt of a heavy metal having an atomic number of 25–60 and an acid selected from the group consisting of inorganic mineral acids and fatty acids of up to 4 carbon atoms, said heavy metal salts being present in amounts sufficient to retard surface staining of phenolic-containing wood when coated by an aqueous dispersion of said composition.

3. The composition of claim 1 containing at least a sufficient amount of water to dissolve said water-soluble heavy metal salt.

4. The composition of claim 2 containing at least a sufficient amount of water to dissolve said water-soluble heavy metal salt.

5. The composition of claim 4 wherein the drying oil-soluble heavy metal salt is present in an amount of about 0.5 to 8% of the condensation product and said water-soluble heavy metal salt is present in an amount of about 2 to 12% of said condensation product.

6. The composition of claim 1 which contains a minor amount of a water-soluble lower monocarboxylic alkanoic acid in an amount sufficient to enhance the anti-staining characteristics of said composition.

7. The composition of claim 2 which contains a minor amount of a water-soluble lower monocarboxylic alkanoic acid in an amount sufficient to enhance the anti-staining characteristics of said composition.

8. The composition of claim 4 which contain about 2 to 12% of a water-soluble, lower monocarboxylic alkanoic acid.

9. The composition of claim 7 wherein the lower alkanoic acid is acetic acid.

10. A liquid, water self-dispersible composition of matter consisting essentially of a condensate of about 75–90% of a drying oil ester of an unsaturated fatty acid ester of 14–20 carbon atoms and a polyhydric alkanol of 3–6 carbon atoms and having 3–6 hydroxyl groups, and about 10–25% of a polyoxyethylene polyol having a molecular weight of about 400–2000, said polyol having the formula $$R\text{---}[O(C_2H_4O)_nH]_m$$

where R is an $m$-valent hydrocarbon radical of 3–6 carbon atoms, $n$ is 4–12 and $m$ is 3–6; about 0.5 to 15% of a drying oil-soluble heavy metal paint drier carboxylic acid salt of a heavy metal having an atomic number of 20–82 and a carboxylic acid of 5 to 40 carbon atoms; and about 1 to 20% of a water-soluble heavy metal salt of a heavy metal having an atomic number from 25–60 and an acid selected from the group consisting of inorganic mineral acids and fatty acids of up to 4 carbon atoms, said heavy metal salts being present in amounts sufficient to retard surface staining of phenolic-containing wood when coated by an aqueous dispersion of said composition, and said composition containing at least a sufficient amount of water to dissolve said water-soluble heavy metal salt.

11. The composition of claim 10 which has incorporated therein about 1 to 20% of a lower monocarboxylic alkanoic acid to improve the anti-staining characteristics of the composition.

12. The composition of claim 11 in which the lower alkanoic acid is acetic acid and is present in an amount of about 2 to 12% based on said condensation product.

13. The composition of claim 12 wherein the water-soluble heavy metal salt is of a metal having an atomic number from 25–30.

14. The composition of claim 13 in which the water-soluble heavy metal salt is cupric acetate and the lower alkanoic acid is acetic acid.

15. The composition of claim 13 in which the water-soluble heavy metal salt is cobalt acetate and the lower alkanoic acid is acetic acid.

16. The composition of claim 10 in which the drying oil ester is modified with a polyhydric alkanol of 3–6 carbon atoms and having 3–6 hydroxyl groups and a dicarboxylic acid of 4–8 carbon atoms, said polyhydric alkanol and dicarboxylic acid being about 5 to 20% of the drying oil ester.

17. The composition of claim 16 wherein the dicarboxylic acid is maleic acid and the modifying polyhydric alcohol is pentaerythritol.

18. The composition of claim 16 which has incorporated therein about 1 to 20% based on said condensation product of a water-soluble, lower monocarboxylic alkanoic acid in an amount sufficient to improve the anti-staining properties of the composition.

19. A liquid, water self-dispersible composition of matter consisting essentially of a condensate of about 75–90% of a drying oil ester of an unsaturated fatty acid ester of 14–20 carbon atoms and a polyhydric alkanol of 3–6 carbon atoms and having 3–6 hydroxyl groups, and about 10–25% of a polyethylene glycol having molecular weight of about 400–2000; about 0.5 to 15% of a dry oil soluble heavy metal paint drier carboxylic acid salt of heavy metal having an atomic number of 20–82 and a carboxylic acid of 5 to 40 carbon atoms; and about 1 to 20% of a water-soluble heavy metal salt of a heavy metal having an atomic number from 25–60 and an acid selected from the group consisting of inorganic mineral acids and fatty acids of up to 4 carbon atoms, said heavy metal salts being present in amounts sufficient to retain surface staining of phenolic-containing wood when coated by a aqueous dispersion of said composition, and said composition containing at least a sufficient amount of water to dissolve said water-soluble heavy metal salt.

20. The composition of claim 19 which has incorporated therein about 1 to 20% based on said condensation product of a water-soluble, lower monocarboxylic alkanoic acid in an amount sufficient to improve the anti-staining characteristics of said composition.

21. The composition of claim 20 in which the water-soluble lower alkanoic acid is acetic acid and is present in amounts of about 2 to 12%, based on said condensation product.

22. A wood base selected from the group consisting of redwood and cedar and having coated thereon the composition of claim 1, said composition having been applied to said wood as an aqueous dispersion.

23. A wood base selected from the group consisting of redwood and cedar and having coated thereon the composition of claim 2, said composition having been applied to said wood as an aqueous dispersion.

24. A wood base selected from the group consisting of redwood and cedar and having coated thereon the composition of claim 5, said composition having been applied to said wood as an aqueous dispersion.

25. A wood base selected from the group consisting of redwood and cedar and having coated thereon the composition of claim 13, said composition having been applied to said wood as an aqueous dispersion.

26. A wood base selected from the group consisting of redwood and cedar and having coated thereon the composition of claim 6, said composition having been applied to said wood as an aqueous dispersion.

27. A wood base selected from the group consisting of redwood and cedar and having coated thereon the composition of claim 7, said composition having been applied to said wood as an aqueous dispersion.

28. A wood base selected from the group consisting of redwood and cedar and having coated thereon the composition of claim 8, said composition having been applied to said wood as an aqueous dispersion.

29. A wood base selected from the group consisting of redwood and cedar and having coated thereon the composition of claim 9, said composition having been applied to said wood as an aqueous dispersion.

30. A wood base selected from the group consisting of redwood and cedar and having coated thereon the composition of claim 10, said composition having been applied to said wood as an aqueous dispersion.

31. A wood base selected from the group consisting of redwood and cedar and having coated thereon the composition of claim 11, said composition having been applied to said wood as an aqueous dispersion.

32. A wood base selected from the group consisting of redwood and cedar and having coated thereon the composition of claim 12, said composition having been applied to said wood as an aqueous dispersion.

33. A wood base selected from the group consisting of redwood and cedar and having coated thereon the composition of claim 14, said composition having been applied to said wood as an aqueous dispersion.

34. A wood base selected from the group consisting of redwood and cedar and having coated thereon the composition of claim 15, said composition having been applied to said wood as an aqueous dispersion.

35. A wood base selected from the group consisting of redwood and cedar and having coated thereon the composition of claim 16, said composition having been applied to said wood as an aqueous dispersion.

36. A wood base selected from the group consisting of redwood and cedar and having coated thereon the composition of claim 17, said composition having been applied to said wood as an aqueous dispersion.

37. A wood base selected from the group consisting of redwood and cedar and having coated thereon the composition of claim 18, said composition having been applied to said wood as an aqueous dispersion.

38. A wood base selected from the group consisting of redwood and cedar and having coated thereon the composition of claim 19, said composition having been applied to said wood as an aqueous dispersion.

39. A wood base selected from the group consisting of redwood and cedar and having coated thereon the composition of claim 20, said composition having been applied to said wood as an aqueous dispersion.

40. A wood base selected from the group consisting of redwood and cedar and having coated thereon the composition of claim 21, said composition having been applied to said wood as an aqueous dispersion.

References Cited

UNITED STATES PATENTS

| | | | |
|---|---|---|---|
| 2,131,040 | 9/1938 | Goodale | 117—151 |
| 2,418,451 | 2/1944 | Auer | 106—252 |
| 3,001,961 | 9/1961 | Armitage et al. | 260—22 |
| 3,100,157 | 8/1963 | Schroeder et al. | 106—252 XR |
| 3,124,475 | 3/1964 | Fisher et al. | 106—310 |

FOREIGN PATENTS

| | | |
|---|---|---|
| 6,717 | 11/1907 | Great Britain. |
| 523,526 | 7/1940 | Great Britain. |
| 202,298 | 6/1956 | Great Britain. |

OTHER REFERENCES

"Handbook of Physics & Chem." 40th edition, page 540; Chemical Rubber Publishing Co., Cleveland, Ohio.

ALEXANDER. H. BRODMERKEL, *Primary Examiner.*

JOSEPH REBOLD, *Examiner.*

J. E. CARSON, J. B. EVANS, *Assistant Examiners.*